Patented Aug. 7, 1951

2,562,988

UNITED STATES PATENT OFFICE 2,562,988

NITRO- AND THIOCYANO-SUBSTITUTED THIOPHENE COMPOUNDS

Rush F. McCleary, Hopewell Junction, N. Y., assignor to The Texas Company, New York, N. Y., a corporation of Delaware No Drawing. Application December 18, 1948, Serial No. 66,145

3 Claims. (Cl. 260—329)

This invention relates to novel thiophene compounds which contain both a nitro group and a thiocyano group as substituents. More specifically, the invention discloses novel thiophene compounds which are substituted in the alpha position by a thiocyano group and in the beta position by a nitro group.

The novel class of compounds of this invention has the general formula

wherein X equals a nitro group, a hydrogen atom, an alkyl group or an alkenyl group and Y is a hydrogen atom, thiocyano group, a halogen atom, an alkyl group or an alkenyl group. 2,5-dithiocyano-3,4-dinitrothiophene and 3-nitro-2-thiocyano-5-chlorothiophene are examples of a novel class of compounds of this invention. 2,5-dithiocyano-3,4-dinitrothiophene is a light yellow powder which discolors but does not melt at a temperature as high as 240° C. 2-thiocyano-3-nitro-5-chlorothiophene is a light yellow powder which melts at 85-860 C.

The novel compounds of this invention are useful as insecticides, fungicides, bactericides and as chemical intermediates in the preparation of such compounds. The rapid burning qualities of 2,5-dithiocyano-3,4-dinitrothiophene suggest that it may be useful as an explosive or as a rocket fuel.

Preparation of the novel class of compounds of this invention is illustrated by the following examples wherein 2,5-dithiocyano-3,4-dinitrothiophene and 2-thiocyano-3-nitro-5-chlorothiophene are prepared. However, it will be understood that the methods of preparation hereinafter described are not intended as a limitation on the novel class of compounds of this invention.

Example I

Sixty-one grams of 2,5-dichloro-3,4-dinitrothiophene was dissolved in 300 cc. alcohol at about 60° C. and 81 grams of sodium thiocyanate was added portionwise, with stirring, during about a one-half hour period. The stirring was continued at 70-76° C. for one hour after all of the sodium thiocyanate had been added. The crude reaction product was stirred with warm water, filtered, washed with formula 30 alcohol and then with acetone. After drying, 68 grams of 2,5-dithiocyano - 3,4 - dinitrothiophene was obtained which burned very rapidly, slowly decomposed without melting at about 240° C., dissolved readily in organic amines but was only slightly soluble in the usual organic solvents and was substantially insoluble in cold water.

The product was found to contain 32.2 per cent sulfur as compared to a theoretical 33.5 per cent sulfur for 2,5-dithiocyano-3,4-dinitrothiophene.

Example II

To a slurry of 45 grams of sodium thiocyanate and 500 cc. of formula 30 alcohol there was added dropwise 50 grams of 3-nitro-2,5-dichlorothiophene prepared as described in the co-pending application Serial No. 25,512 entitled 2,5-dichloro-3-nitrothiophene, filed May 6, 1948, in the name of Lawrence W. Devaney at 25-30° C. during a period of about one-half hour. The stirring was continued for an additional half hour then the reaction mix was gradually warmed over a period of about 35 minutes to reflux temperature. Refluxing was continued for one hour. The cooled reaction mixture was filtered. The filtrate was allowed to evaporate until most of the alcohol was removed and the residue was extracted with about 750 cc. ether. The ether solution was water washed until the wash water showed a negative test for chloride or thiocyanate ion. After evaporation of the ether, 40 grams of crude product remained which was purified by crystallization from alcohol followed by fractional precipitation by addition of water to an acetone solution of the product.

The purified 3-nitro, 2-thiocyano, 5-chlorothiophene melted at 85.2-86.6° C. On analysis, the purified compound was found to contain 26.7 per cent carbon, 0.6 per cent hydrogen, 28.6 per cent sulfur and 16.3 per cent chlorine as compared with theoretical values of 27.2 per cent, 0.5 per cent, 29.0 per cent and 16.1 per cent for the elements in the order named.

Obviously, many modifications and variations of the invention as hereinbefore set forth may be made without departing from the spirit and scope thereof, and therefore only such limitations should be imposed as are indicated in the appended claims.

I claim:
1. 2,5-dithiocyano-3,4-dinitrothiophene.
2. 2-thiocyano-3-nitro-5-chlorothiophene.
3. Monocyclic thiophene compounds containing a thiocyano group substituted on the 2-position, a nitro group substituted on the 3-position, a group selected from the class consisting of hydrogen and the nitro group substituted on the 4-position, and a group selected from the class consisting of chlorine and the thiocyano group on the 5-position.

RUSH F. McCLEARY.

REFERENCES CITED

The following references are of record in the file of this patent:

Chemical Abstracts 28, 4730, (2) (1934).
J. Am. Chem. Soc. 60, 2907 (1938).